US012230896B2

(12) United States Patent
Hsu et al.

(10) Patent No.: US 12,230,896 B2
(45) Date of Patent: Feb. 18, 2025

(54) ANTENNA STRUCTURE AND ELECTRONIC DEVICE USING THE SAME

(71) Applicant: Chiun Mai Communication Systems, Inc., New Taipei (TW)

(72) Inventors: Cho-Kang Hsu, New Taipei (TW); Min-Hui Ho, New Taipei (TW)

(73) Assignee: Chiun Mai Communication Systems, Inc., New Taipei (TW)

( * ) Notice: Subject to any disclaimer, the term of this patent is extended or adjusted under 35 U.S.C. 154(b) by 296 days.

(21) Appl. No.: 17/839,709

(22) Filed: Jun. 14, 2022

(65) Prior Publication Data

US 2022/0407227 A1 Dec. 22, 2022

(30) Foreign Application Priority Data

Jun. 21, 2021 (CN) ......................... 202110688067.9

(51) Int. Cl.
*H01Q 1/24* (2006.01)
*H01Q 5/35* (2015.01)
*H01Q 9/42* (2006.01)

(52) U.S. Cl.
CPC ............... *H01Q 5/35* (2015.01); *H01Q 1/243* (2013.01); *H01Q 9/42* (2013.01)

(58) Field of Classification Search
CPC ............ H01Q 1/243; H01Q 5/20; H01Q 5/35; H01Q 5/50; H01Q 9/42
See application file for complete search history.

(56) References Cited

U.S. PATENT DOCUMENTS

2021/0210839 A1* 7/2021 Hsu .......................... H01Q 1/38
2023/0352854 A1* 11/2023 Wu .......................... H01Q 7/00
2023/0361467 A1* 11/2023 Wu .......................... H01Q 5/40

FOREIGN PATENT DOCUMENTS

CN 206236793 U 6/2017
CN 110620290 A 12/2019
CN 212136680 U 12/2020
CN 112736421 A 4/2021

* cited by examiner

*Primary Examiner* — Daniel Munoz
(74) *Attorney, Agent, or Firm* — ScienBiziP, P.C.

(57) ABSTRACT

An antenna structure includes at least one radiation portion, first, second, and third feed sources, and first and second grounding portions. The at least one radiation portion is formed by a partial portion of the metal frame of the electronic device, the portion being defined by gaps. The first to third feed sources are arranged at intervals and are electrically connected to the at least one radiation portion in such a way as to make the radiation portion form a plurality of antennas. The first end of the first grounding portion is electrically connected to the radiation portion, the second end of the first grounding portion is grounded, the first end of the second grounding portion is electrically connected to the radiation portion, and the second end of the second grounding portion is grounded. The present disclosure also provides an electronic device with the antenna structure.

16 Claims, 11 Drawing Sheets

ANTENNA STRUCTURE AND ELECTRONIC DEVICE USING THE SAME

FIELD

The subject matter herein generally relates to wireless communications, an antenna structure and electronic device using the same.

BACKGROUND

With the progress of wireless communication technology, mobile phones, personal digital assistants and other electronic devices offer diversified functions, are lightweight, faster and more efficient in data transmission. The space available for the antenna is getting smaller and smaller. However, with the continuous development of wireless communication technology, demand for bandwidth is increasing. An antenna with wide bandwidth and better efficiency in a limited space is desired.

Therefore, improvement is needed.

BRIEF DESCRIPTION OF THE DRAWINGS

Implementations of the present disclosure will now be described, by way of embodiments, with reference to the attached figures.

DETAILED DESCRIPTION

Figure 1:
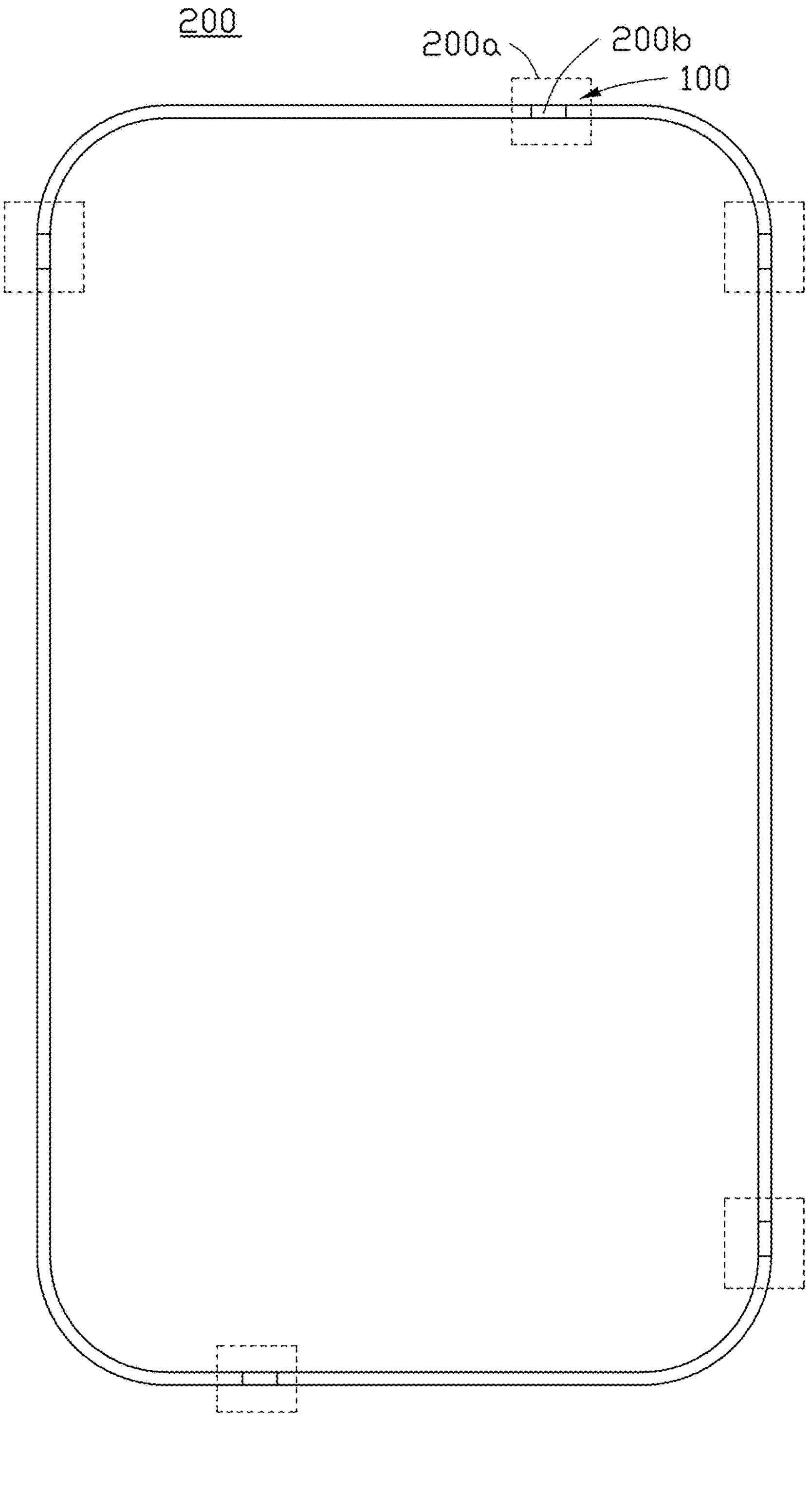
FIG. 1 is a schematic diagram of an embodiment of an antenna structure applied to an electronic device of the present disclosure.

It will be appreciated that for simplicity and clarity of illustration, where appropriate, reference numerals have been repeated among the different figures to indicate corresponding or analogous elements. Additionally, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising" means "including, but not necessarily limited to"; it specifically indicates open-ended inclusion or membership in a so-described combination, group, series, and the like.

Figure 2:
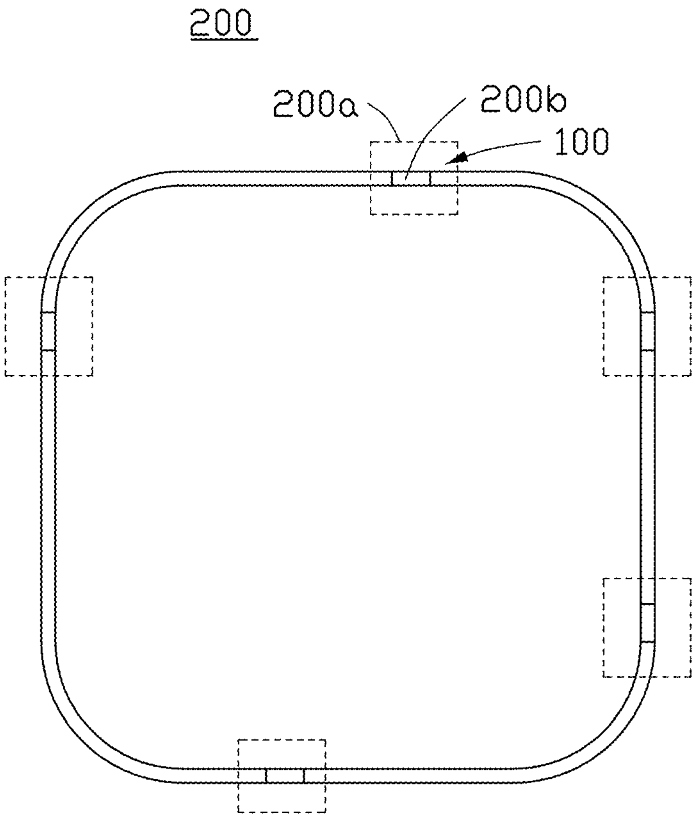
FIG. 2 is a schematic diagram of an embodiment of the antenna structure applied to another electronic device of the present disclosure.
Figure 3:
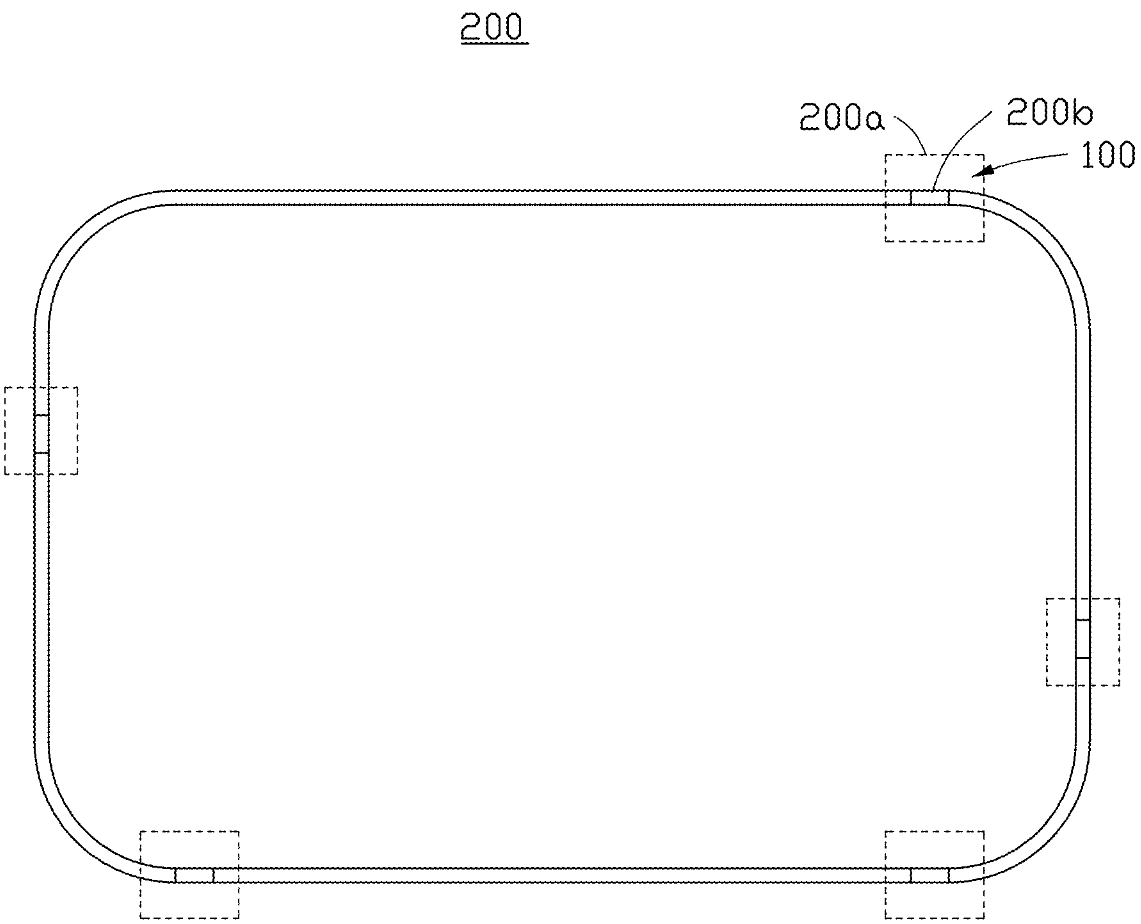
FIG. 3 is a schematic diagram of an embodiment of the antenna structure applied to another electronic device of the present disclosure.

FIGS. 1 to 3 illustrate an antenna structure 100 in accordance with an embodiment of the present disclosure. The antenna structure 100 can be applied to an electronic device 200. The electronic communication device 200 can transmit and receive radio waves to transmit and exchange radio signals. The electronic device 200 may be, but not limited to, a handheld communication device (such as a mobile phone), a foldable phone, an intelligent wearable device (such as a watch, headphones), a tablet computer, a personal digital assistant (PDA).

As shown in FIG. 1, the antenna structure 100 can be applied to the electronic device 200, and the electronic device 200 is a mobile phone. As shown in FIG. 2, the antenna structure 100 can be applied to the electronic device 200, and the electronic device 200 is a watch. As shown in FIG. 3, the antenna structure 100 can be applied to the electronic device 200, and the electronic device 200 is a tablet computer. As shown in FIGS. 1 to 3, the antenna structure 100 is formed by a metal frame of the electronic device 200, and the antenna structure 100 can be arranged in the area 200*a* shown in the figures. The area 200*a* is a position or area of gap 200*b* within the electronic device 200.

The electronic device 200 may adopt one or more of the following communication technologies: Bluetooth (BT) communication technology, global positioning system (GPS) communication technology, wireless fidelity (Wi-Fi) communication technology, global system for mobile communications (GSM) communication technology, wideband code division multiple access (WCDMA) communication technology, long term evolution (LTE) communication technology, 5G communication technology, SUB-6G communication technology and other communication technologies in the future.

The embodiment of the present disclosure takes the electronic device 200 as a mobile phone as an example.

Figure 4:
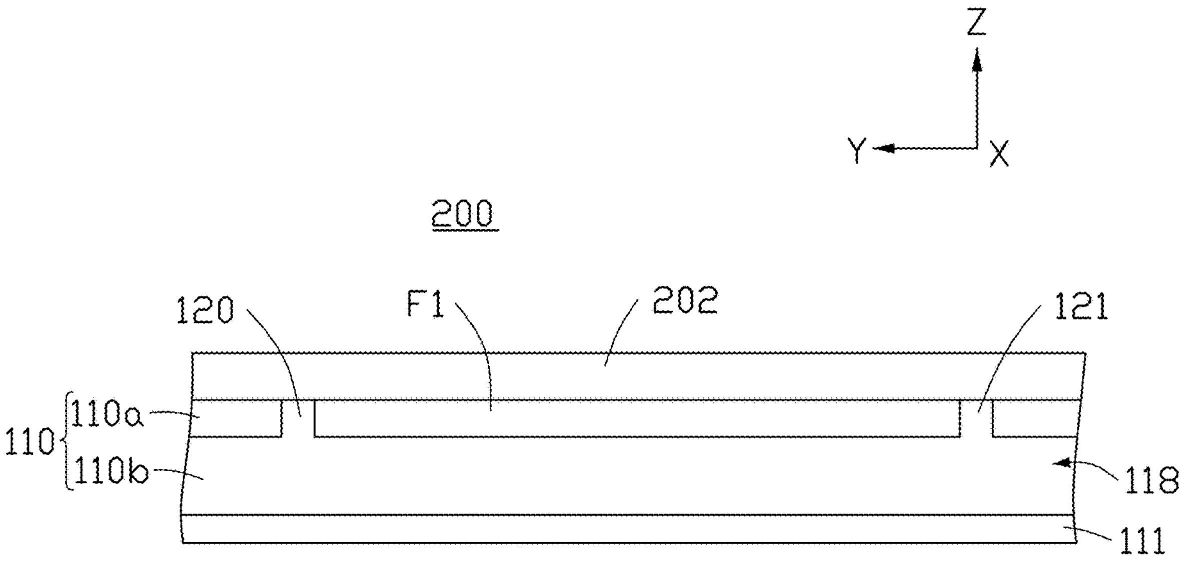
FIG. 4 is a schematic diagram of an embodiment of the antenna structure of the present disclosure.
Figure 5:
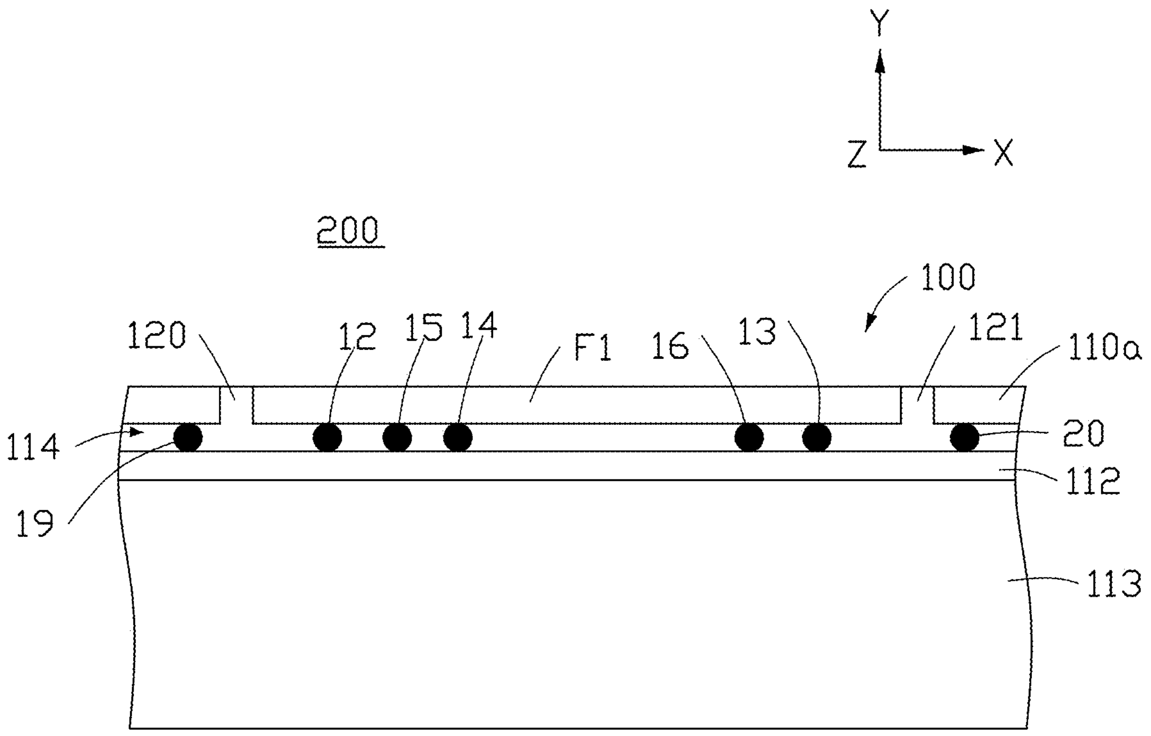
FIG. 5 is a schematic diagram of an embodiment of the antenna structure shown in FIG. 4, viewed from another angle.
Figure 6:
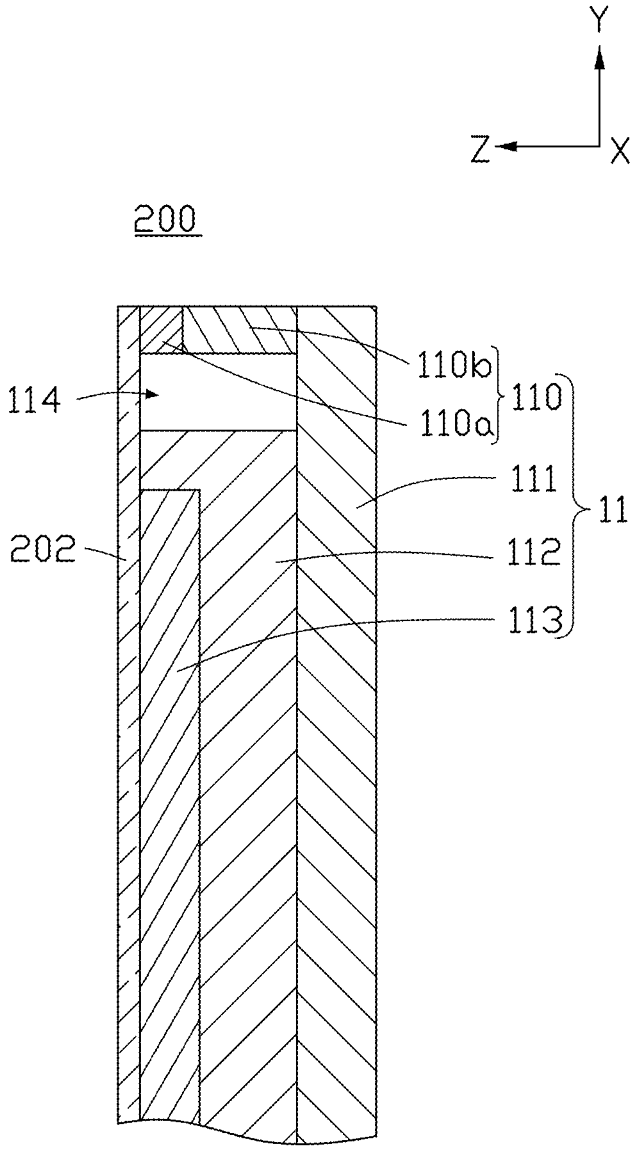
FIG. 6 is a schematic cross-sectional view of an embodiment of the antenna structure of the present disclosure.

Referring to FIGS. 4 to 6, FIG. 4 is a schematic side view of the electronic device 200, FIG. 5 is a schematic diagram of the electronic device 200 at another angle, FIG. 6 is a schematic cross-sectional view of the electronic device 200. The electronic device 200 includes a housing 11 (shown in FIG. 6) and a display unit 202. The housing 11 includes at least a frame 110, a backplane 111, a ground plane 112, and a middle frame 113 (shown in FIG. 5).

The frame 110 is made of metal or other conductive materials. The backplane 111 may be made of metal or other conductive materials. The frame 110 is disposed on the edge of the backplane 111 and forms a receiving space 114 (shown in FIG. 5 and FIG. 6) together with the backplane 111. One side of the frame 110 opposite to the backplane 111 defines an opening (not shown in the figure) for receiving the display unit 202. The display unit 202 includes a display plane, and the display plane is exposed to the opening. The display unit 202 can be combined with a touch sensor to form a touch screen, or touch panel or touch sensitive panel.

In the embodiment, the display unit 202 has a high screen-to-body proportion. The area of the display plane of the display unit 202 is greater than 70% of the front area of the electronic device, and even a front full screen can be achieved. In the embodiment of the present disclosure, the full screen means that the left, right and lower sides of the display unit 202 can be seamlessly connected to the frame 110 except for the necessary slots defined on the antenna structure 100.

The ground plane 112 may be made of metal or other conductive material. The ground plane 112 can be disposed in the receiving space 114 surrounded by the frame 110 and the backplane 111, and the ground plane 112 is connected to the backplane 111.

The middle frame 113 is made of metal or other conductive materials. The shape and size of the middle frame 113 may be smaller than those of the ground plane 112. The middle frame 113 is superimposed on the ground plane 112. In the embodiment, the middle frame 113 is a metal sheet disposed between the display unit 202 and the ground plane 112. The middle frame 113 is used to support the display unit 202, provide electromagnetic shielding, and improve the structural strength of the electronic device 200.

In the embodiment, the frame 110, the backplane 111, the ground plane 112, and the middle frame 113 form an integrated metal frame. The backplane 111, the ground plane 112, and the middle frame 113 are large areas of metal, and the backplane 111, the ground plane 112, and the middle frame 113 jointly form the system ground plane (not shown in the figure) of the electronic device 200.

In other embodiment, the electronic device 200 may also include components, such as a processor, a circuit board, a memory, an input/output circuit, an audio component (such as a microphone, a speaker, etc.), a multimedia component (such as a front camera and/or a rear camera), and sensor components (such as proximity sensor, distance sensor, ambient light sensor, acceleration sensor, gyroscope, magnetic sensor, pressure sensor and/or temperature sensor, etc.).

Referring to FIG. 5, the antenna structure 100 includes at least one radiation portion F1, a first feed source 12, a second feed source 13, a third feed source 14, a first grounding portion 15, and a second grounding portion 16.

The radiation portion F1 is made of metal material. In the embodiment, the radiation portion F1 is a partial portion of the frame 110 of the electronic device 200. The frame defines a slot 118 (shown in FIG. 4). The slot 118 is integrally arranged on the side of the frame 110 close to the backplane 111 and extends in the direction towards the display unit 202. In the embodiment, the slot 118 is filled with insulating materials, such as plastic, rubber, glass, wood, ceramics, etc., not limited to these. Therefore, the frame 110 is divided into a metal portion 110*a* and an insulating portion 110*b* by the setting of the slot 118.

The frame 110 further defines at least one gap.

In the embodiment, the frame 110 defines at least two gaps, such as the first gap 120 and the second gap 121. The first gap 120 and the second gap 121 are spaced apart and defined on the metal portion 110*a* of the frame 110, both the first gap 120 and the second gap 121 are connected to the slot 118 and cut off the metal portion 110*a*. Therefore, the division created by the first gap 120 and the second gap 121 form at least one radiation portion (such as the radiation portion F1) from the metal portion 110*a* of the frame 110. In the embodiment, the frame 110 (i.e., the metal portion 110*a*) between the first gap 120 and the second gap 121 forms the radiation portion F1.

In the embodiment, the first gap 120 and the second gap 121 are also filled with insulating materials, such as plastic, rubber, glass, wood, ceramics, etc., not limited thereto.

In the embodiment, the width of the first gap 120 and the second gap 121 can be set to 1 mm-2 mm.

In the embodiment, the first feed source 12 is arranged on the inner side of the radiation portion F1. One end of the first feed source 12 can be electrically connected to the side of the radiation portion F1 close to the first gap 120 to feed a current and signal to the radiation portion F1.

The second feed source 13 is arranged on the inner side of the radiation portion F1 and is arranged at intervals from the first feed source 12. One end of the second feed source 13 can be electrically connected to the side of the radiation portion F1 close to the second gap 121 by a spring sheet, a microstrip line, a strip line, a coaxial cable, etc., so as to feed a current and signal to the radiation portion F1.

The third feed source 14 is arranged on the inner side of the radiation portion F1 and is spaced from the first feed source 12 and the second feed source. The third feed source 14 is arranged between the first feed source 12 and the second feed source 13. In the embodiment, the first feed source 12 and the second feed source 13 are respectively arranged near the end of the radiation portion F1, the third feed source 14 is arranged between the first feed source 12 and the second feed source 13, and the third feed source 14 is closer to the first feed source 12 than the second feed source 13. One end of the third feed source 14 can be electrically connected to the side of the radiation portion F1 by a spring sheet, a microstrip line, a strip line, a coaxial cable, etc., so as to feed a current and signal to the radiation portion F1.

In the embodiment, the first feed source 12, the second feed source 13 and the third feed source 14 share the radiation portion F1. The three feed sources are spaced from each other and electrically connected to the radiation portion F1 to feed their current signals to the radiation portion F1. The first feed source 12, the second feed source 13, and the third feed source 14 are monopole antenna feed sources, so that the antenna structure 100 forms a plurality of monopole antennas.

The first grounding portion 15 is arranged on the inner side of the radiation portion F1. The first grounding portion 15 is arranged between the first feed source 12 and the third feed source 14. One end of the first grounding portion 15 can be electrically connected to the side of the ground plane 112 by a spring sheet, a microstrip line, a strip line, a coaxial cable, etc., other end of the first grounding portion 15 can be electrically connected to the radiation portion F1 to provide grounding for the radiation portion F1.

The second grounding portion 16 is arranged on the inner side of the radiation portion F1. The second grounding portion 16 is arranged between the second feed source 13 and the third feed source 14, and the second grounding portion 16 is closer to the second feed source 13 than the third feed source 14. One end of the second grounding portion 16 can be electrically connected to the side of the ground plane 112 by a spring sheet, a microstrip line, a strip line, a coaxial cable, etc., other end of the second grounding portion 16 can be electrically connected to the radiation portion F1 to provide grounding for the radiation portion F1.

Figure 7:
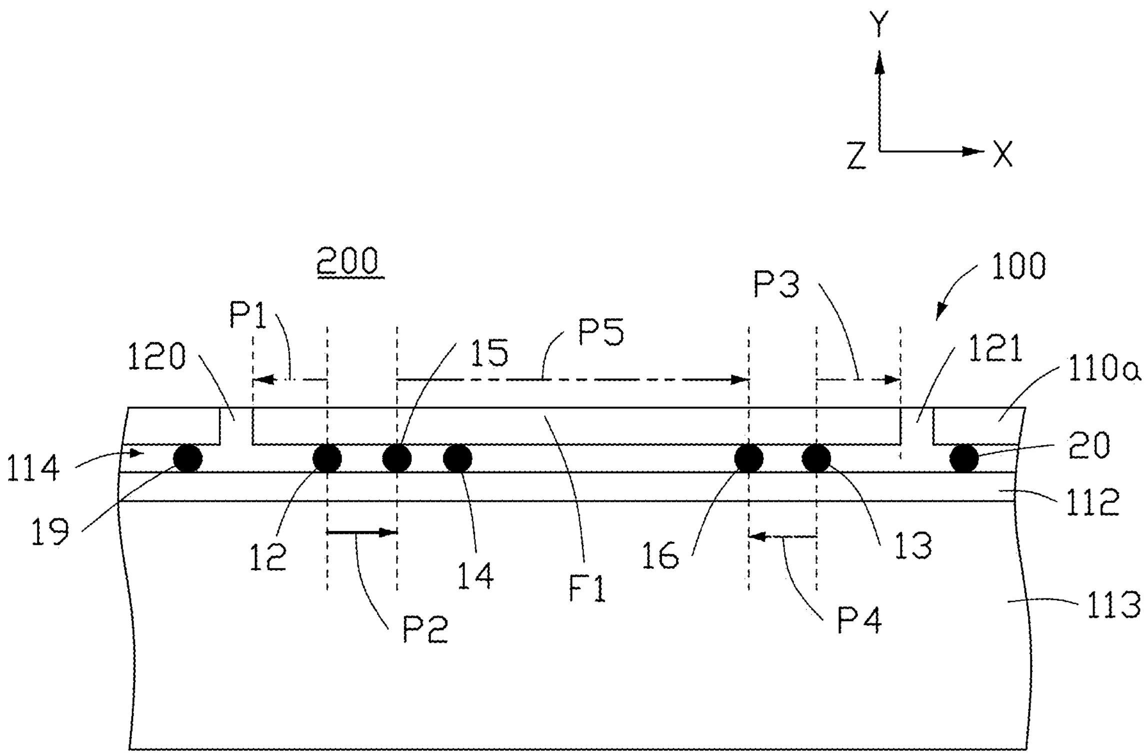
FIG. 7 is a schematic diagram of flow directions of electrical current of the antenna structure of the present disclosure.

FIG. 7 shows current paths of the antenna structure 100.

When the current is fed from the first feed source 12, the current will be fed into the radiation portion F1 through a first matching circuit (not shown in the figure), and the current will flow to the first gap 120 (path P1), so as to excite a first working mode to generate a radiation signal of the first radiation frequency band.

When the current is fed from the first feed source 12, the current will be fed into the radiation portion F1 through the first matching circuit and the current will flow into the first grounding portion 15 (path P2), so as to excite a second working mode to generate a radiation signal of the second radiation frequency band.

When the current is fed from the second feed source 13, the current will be fed into the radiation portion F1 through a second matching circuit (not shown in the figure), and the current will flow to the second gap 121 (path P3), so as to excite a third working mode to generate a radiation signal of the third radiation frequency band.

When the current is fed from the second feed source 13, the current will be fed into the radiation portion F1 through the second matching circuit, and the current will flow into the second grounding portion 16 (path P4), so as to excite a fourth working mode to generate a radiation signal of the fourth radiation frequency band.

When the current is fed from the third feed source 14, the current will be fed into the radiation portion F1 through a third matching circuit (not shown in the figure), and the current will flow from the first grounding portion 15 to the second grounding portion 16 (path P5), so as to excite a fifth working mode to generate the radiation signal of the fifth radiation radio frequency band.

In the embodiment, the first radiation frequency band and the third radiation frequency band are in the radiation frequency band of Wi-Fi 2.4 GHz. The frequencies of the first radiation frequency band and the third radiation frequency band are 2400-2484 MHz. The second radiation frequency band and the fourth radiation frequency band are in the radiation frequency band of Wi-Fi 5 GHz. The frequencies of the second radiation frequency band and the fourth radiation frequency band are 5150-5850 MHz. The fifth radiation frequency band is in the radiation frequency band of global positioning system (GPS). The frequency of the fifth radiation band is 1575 MHz. That is, the paths P1 and P3 are the current paths for Wi-Fi 2.4 GHz mode. The paths P2 and P4 are current paths for Wi-Fi 5 GHz mode. The path P5 is the current path for GPS mode.

Figure 8:
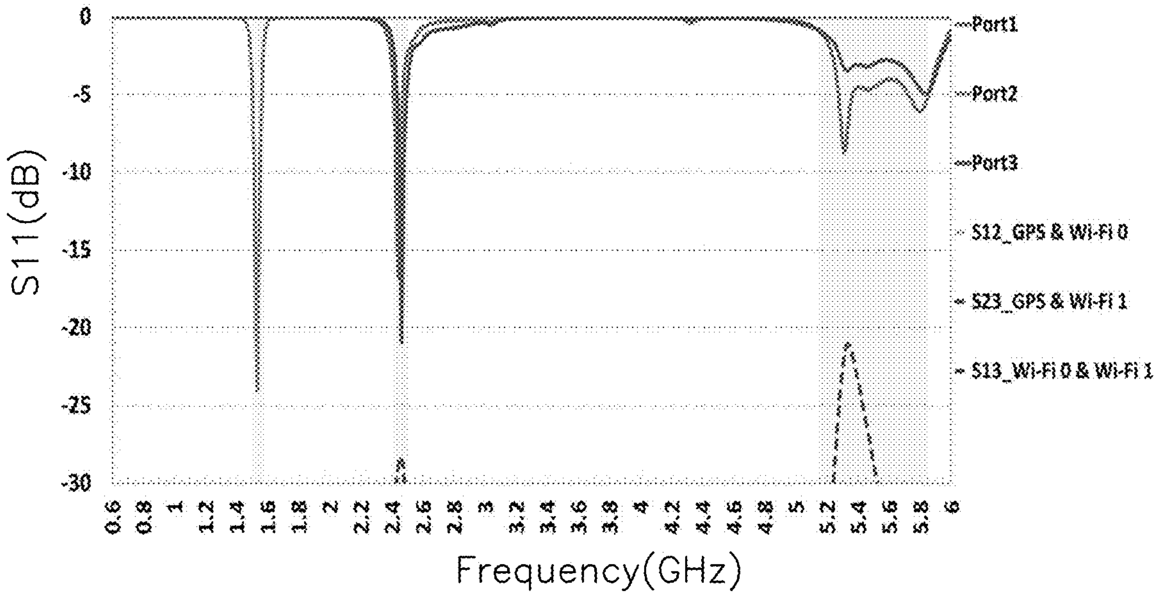
FIG. 8 is graph of scattering parameters (S parameters) of the antenna structure of the present disclosure.
Figure 9:
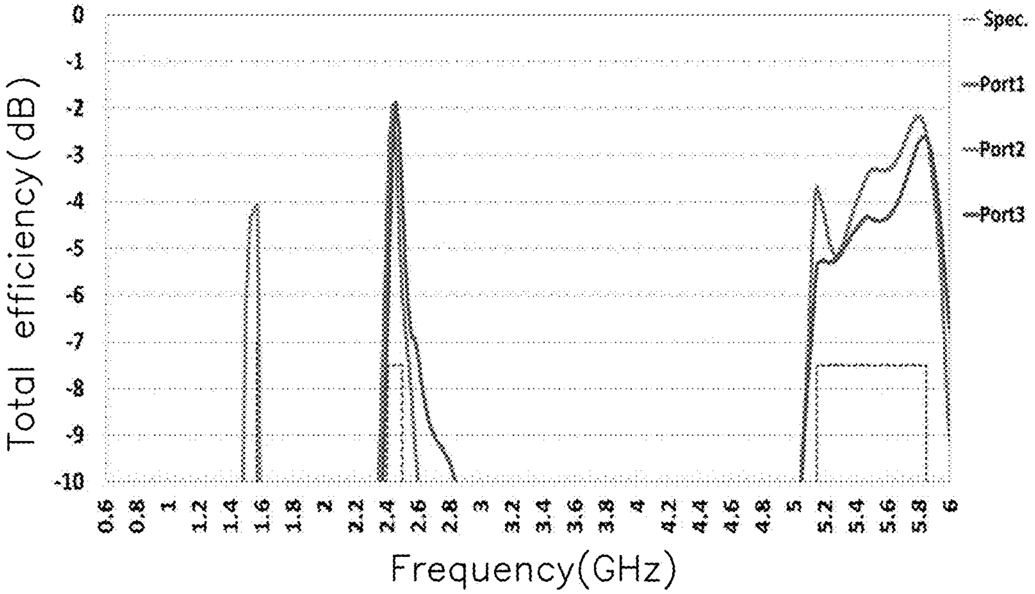
FIG. 9 is efficiency curve of the antenna structure of the present disclosure.

FIG. 8 is a graph of S parameters (scattering parameters) of the antenna structure 100. FIG. 9 is a graph of the overall efficiency of the antenna structure 100.

In the embodiment, the radiation portion F1 forms a multiple-feed antenna structure, such as being a 3-feed common antenna structure, the three feed sources (such as the first feed source 12, the second feed source 13 and the third feed source 14) being arranged at intervals on one side of the radiation portion F1, allowing the radiation portion F1 to form a plurality of monopole antennas (such as GPS antenna, Wi-Fi 2.4G antenna and Wi-Fi 5G antenna), thereby the corresponding GPS frequency band, Wi-Fi 2.4G frequency band and Wi-Fi 5G frequency band are generated. In the embodiment, the radiation portion F1 can form a dual Wi-Fi 2.4G antenna and a dual Wi-Fi 5G antenna. In addition, the embodiment of the present disclosure can set the first grounding portion 15 and the second grounding portion 16 at the appropriate positions of the radiation portion F1, so that multiple antennas can be fed into the same radiator (i.e. the radiation portion F1) at the same time, and better antenna performance and better isolation effect can be obtained.

In the embodiment of the present disclosure, the first working mode and the fifth working mode may be effectively adjusted by adjusting the positions of the first grounding portion 15 and the second grounding portion 16.

For example, when the position of the first grounding portion 15 is adjusted so that the first grounding portion 15 is closer to the first feed source 12 compared to the third feed source 14, the fifth working mode (such as GPS mode) is farther away from the first working mode (such as Wi-Fi 2.4G mode) and the second working mode (such as Wi-Fi 5G mode). When the first grounding portion 15 is arranged to be closer to the third feed source 14 compared to the first feed source 12, the fifth working mode (such as GPS mode) becomes closer to the first working mode (such as Wi-Fi 2.4G mode) and the second working mode (such as Wi-Fi 5G mode).

When the position of the second grounding portion 16 is adjusted so that the second grounding portion 16 is closer to the second feed source 13 compared to the third feed source 14, the fifth working mode (such as GPS mode) is farther away from the third working mode (such as Wi-Fi 2.4G mode) and the fourth working mode (such as Wi-Fi 5G mode). When the second grounding portion 16 is arranged to be closer to the third feed source 14 compared to the second feed source 13, the fifth working mode (such as GPS mode) is closer to the third working mode (such as Wi-Fi 2.4G mode) and the fourth working mode (such as Wi-Fi 5G mode).

Figure 10:
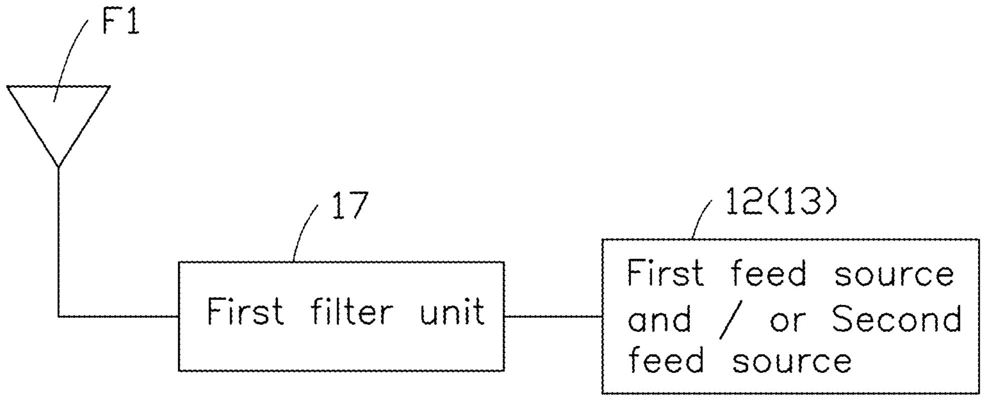
FIG. 10 is a schematic diagram of an embodiment of a first filter unit of the present disclosure.
Figure 11:
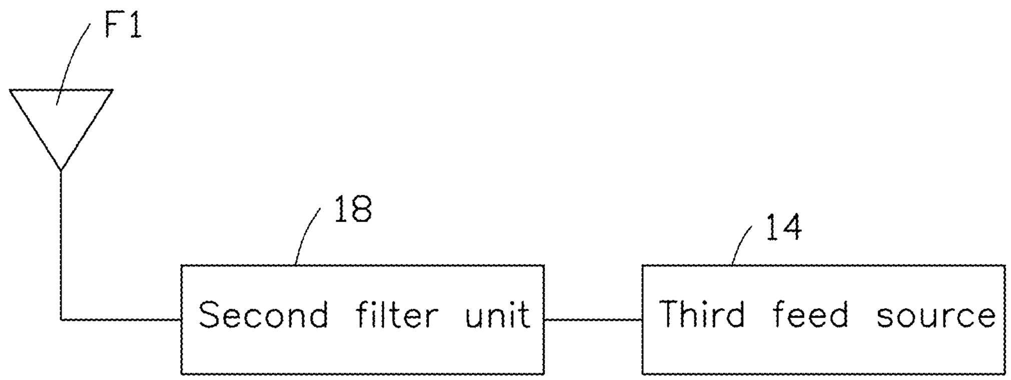
FIG. 11 is a schematic diagram of an embodiment of a second filter unit of the present disclosure.

Referring to FIG. 10 and FIG. 11, in the embodiment, the antenna structure 100 further includes a first filter unit 17 and a second filter unit 18. The first filter unit 17 is a high pass filter (HPF). The second filter unit 18 is a low pass filter (LPF). The first end of the first filter unit 17 is electrically connected to the first feed source 12 and/or the second feed source 13, and the second end of the first filter unit 17 is electrically connected to the radiation portion F1. The first end of the second filter unit 18 is electrically connected to the third feed source 14, and the second end of the second filter unit 18 is electrically connected to the radiation portion F1. Therefore, the Wi-Fi 2.4G antenna and Wi-Fi 5G antenna radiate through the high pass filter and the radiation portion F1. The GPS antenna can radiate through the low pass filter and the radiation portion F1. The first feed source 12, the second feed source 13, and the third feed source 14 radiate through the corresponding filter unit and then through the radiation portion F1, so as to effectively improve the bandwidth and antenna efficiency of GPS, Wi-Fi 2.4G and Wi-Fi 5G.

In the embodiment, the antenna structure 100 greatly improves the bandwidth and antenna efficiency of GPS, Wi-Fi 2.4G and Wi-Fi 5G through the setting of the first filter unit 17 and the second filter unit 18, and covers the application of GPS and Wi-Fi bands. The antenna structure 100 can obtain better performance, isolate the antenna structure 100 more effectively, and greatly improve bandwidth and efficiency.

Referring to FIG. 5, in the embodiment, the metal portion 110*a* of the frame 110 on both sides of the radiation portion F1 can also be an antenna radiator or simply a metal frame. For example, when the metal portions 110*a* on each side of the radiation portion F1 are also provided with feeds, they can be used as radiators to work in a frequency band correspondingly.

In the embodiment, the metal portion 110*a* of the frame 110 on both sides of the radiation portion F1 may or may not exist depending on the required frequency bands. For example, in one embodiment, the antenna structure 100 without the first gap 120 and the second gap 121, means that the radiation portion F1 is composed of a metal portion 110*a* in the complete frame 110. When the antenna structure 100 needs to work in other frequency bands, the metal portions 110*a* of the frame 110 on either side of the radiation portion F1 can be used and feed sources can be arranged so that the metal portions 110*a* on either side of the radiation portion F1 serve as radiation portions.

Referring to FIG. 5, in the embodiment, the metal portions 110*a* of the frame 110 on either side of the radiation portion F1 can also be electrically connected to the ground plane 112 (the metal portions 110*a* are grounded) or left ungrounded. When the metal portions 110*a* of the frame 110 on both sides of the radiation portion F1 are grounded through a grounding portion (such as grounding portions 19, 20), the position of the grounding portion can be adjusted based on the required frequency.

In the embodiment, the shape, length, and width of the radiation portion F1 in the antenna structure 100 can be adjusted based on the required frequencies. The arrangement of gaps, feed sources, and grounding portions in the antenna structure 100 can also be adjusted based on the required frequency. The antenna structure 100 is not limited to work in the GPS, Wi-Fi 2.4G and Wi-Fi 5G radiation frequency bands described above. It can also form a diversity antenna, ultra-intermediate frequency (1447.9-1510.9 MHz) antenna, ultra-high frequency (3400-3800 MHz) antenna, and N77, N78 and N79 antenna according to the demand, and work in corresponding radiation frequency band.

The antenna structure 100 forms a three-feed common antenna structure, and by setting the first grounding portion 15 and the second grounding portion 16, the antenna structure 100 has good performance, better isolation of the antenna structure 100, improved bandwidth, and optimal antenna efficiency. The antenna structure 100 improves isolation of the antenna structure 100 and greatly improves its bandwidth and antenna efficiency by applying the first filter unit 17 and the second filter unit 18.

Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will, therefore, be appreciated that the exemplary embodiments described above may be modified within the scope of the claims.

What is claimed is:

1. An antenna structure of an electronic device, the electronic device comprising a metal frame, comprising: at least one radiation portion formed by a partial portion of the metal frame; a first feed source, a second feed source and a third feed source being spaced at intervals and feeding current signals to the at least one radiation portion; a first grounding portion; and a second grounding portion spaced from the first grounding portion, wherein a first end of the first grounding portion and a first end of the second grounding portion electrically connect to the at least one radiation portion, and a second end of the first grounding portion and a second end of the second grounding portion are grounded, wherein the metal frame defines a first gap and a second gap, the first gap and the second gap cut off the metal frame, and the at least one radiation portion is formed by the metal frame between the first gap and the second gap, the first feed source electrically connects to one end of the at least one radiation portion close to the first gap, the second feed source electrically connects to one end of the at least one radiation portion close to the second gap, and the third feed source is arranged between the first feed source and the second feed source, and electrically connects to the at least one radiation portion.

2. The antenna structure according to claim 1, wherein the first feed source feeds current to the at least one radiation portion and the current flows to the first gap to generate a radiation signal of a first radiation frequency band;

the first feed source feeds current to the at least one radiation portion and the current flows to the first grounding portion to generate a radiation signal of a second radiation frequency band;

the second feed source feeds current to the at least one radiation portion and the current flows to the second gap to generate a radiation signal of a third radiation frequency band;

the second feed source feeds current to the at least one radiation portion and the current flows to the second grounding portion to generate a radiation signal of a fourth radiation frequency band; and the third feed source feeds current to the at least one radiation portion and the current flows from the first grounding portion to the second grounding portion to generate a radiation signal of a fifth radiation frequency band.

3. The antenna structure according to claim 2, wherein the first radiation frequency band and the third radiation frequency band are in the radiation frequency band of Wi-Fi 2.4 GHZ, the second radiation frequency band and the fourth radiation frequency band are in the radiation frequency band of Wi-Fi 5 GHz, and the fifth radiation frequency band is in the radiation frequency band of global positioning system (GPS).

4. The antenna structure according to claim 1, further comprising a first filter unit, wherein the first filter unit is a high pass filter, a first end of the first filter unit electrically connects to the first feed source or the second feed source, and a second end of the first filter unit electrically connects to the at least one radiation portion.

5. The antenna structure according to claim 1, further comprising a second filter unit, wherein the second filter unit is a low pass filter, a first end of the second filter unit electrically connects to the third feed source, and a second end of the second filter unit electrically connects to the at least one radiation portion.

6. The antenna structure according to claim 1, wherein the metal frame on both sides of the at least one radiation portion is grounded through corresponding grounding portions.

7. The antenna structure according to claim 1, wherein the metal frame on both sides of the at least one radiation portion electrically connects to corresponding feed sources feeding the current signals to the metal frame on both sides of the at least one radiation portion.

8. The antenna structure according to claim 1, wherein the first grounding portion is arranged between the first feed source and the third feed source, and the second grounding portion is arranged between the third feed source and the second feed source.

9. An electronic device comprising: a metal frame; an antenna structure comprising: at least one radiation portion formed by a partial portion of the metal frame; a first feed source, a second feed source and a third feed source being spaced at intervals and feeding current signals to the at least one radiation portion; a first grounding portion; and a second grounding portion spaced from the first grounding portion; wherein a first end of the first grounding portion and a first end of the second grounding portion electrically connect to the at least one radiation portion, and a second end of the first grounding portion and a second end of the second grounding portion are grounded; and wherein the metal frame defines a first gap and a second gap, the first gap and the second gap cut off the metal frame, and the at least one radiation portion is formed by the metal frame between the first gap and the second gap, the first feed source electrically connects to one end of the at least one radiation portion close to the first gap, the second feed source electrically connects to one end of the at least one radiation portion close to the second gap, and the third feed source is arranged between the first feed source and the second feed source, and electrically connects to the at least one radiation portion.

10. The electronic device according to claim 9, wherein
the first feed source feeds current to the at least one radiation portion and the current flows to the first gap to generate a radiation signal of a first radiation frequency band;
the first feed source feeds current to the at least one radiation portion and the current flows to the first grounding portion to generate a radiation signal of a second radiation frequency band;
the second feed source feeds current to the at least one radiation portion and the current flows to the second gap to generate a radiation signal of a third radiation frequency band;
the second feed source feeds current to the at least one radiation portion and the current flows to the second grounding portion to generate a radiation signal of a fourth radiation frequency band; and
the third feed source feeds current to the at least one radiation portion and the current flows from the first grounding portion to the second grounding portion to generate a radiation signal of a fifth radiation frequency band.

11. The electronic device according to claim 10, wherein
the first radiation frequency band and the third radiation frequency band are in the radiation frequency band of Wi-Fi 2.4 GHz mode,
the second radiation frequency band and the fourth radiation frequency band are in the radiation frequency band of Wi-Fi 5 GHz mode, and
the fifth radiation frequency band is in the radiation frequency band of global positioning system (GPS) mode.

12. The electronic device according to claim 9, further comprising a first filter unit, wherein the first filter unit is a high pass filter, a first end of the first filter unit electrically connects to the first feed source or the second feed source, and a second end of the first filter unit electrically connects to the at least one radiation portion.

13. The electronic device according to claim 9, further comprising a second filter unit, wherein the second filter unit is a low pass filter, a first end of the second filter unit electrically connects to the third feed source, and a second end of the second filter unit electrically connects to the at least one radiation portion.

14. The electronic device according to claim 9, wherein the metal frame on both sides of the at least one radiation portion is grounded through corresponding grounding portions.

15. The electronic device according to claim 9, wherein the metal frame on both sides of the at least one radiation portion electrically connects to corresponding feed sources feeding the current signals to the metal frame on both sides of the at least one radiation portion.

16. The electronic device according to claim 9, wherein
the first grounding portion is arranged between the first feed source and the third feed source, and
the second grounding portion is arranged between the third feed source and the second feed source.

* * * * *